| Curve | % Alloy #3 | % Ag | % Ni |
|---|---|---|---|
| 1 | 1 | 85.3 | 13.5 |
| 2 | 3 | 83.5 | 13.5 |
| 3 | 5 | 81.5 | 13.5 |
| 4 | 8 | 79.0 | 13.0 |
| 5 | 10 | 78.0 | 12.0 |

United States Patent Office 3,428,490
Patented Feb. 18, 1969

3,428,490
NOBLE METAL ALUMINUM ALLOYS AS CATALYSTS FOR FUEL CELL ELECTRODES
Justo B. Bravo, Malvern, and Glenn R. Dimeler, West Chester, Pa., assignors to Sun Oil Company, Philadelphia, Pa., a corporation of New Jersey
Filed Aug. 29, 1962, Ser. No. 220,250
U.S. Cl. 136—86        7 Claims
Int. Cl. H01m 27/00; C22c 5/00

This invention relates to fuel cell electrodes containing certain catalytic noble metal-aluminum alloys which potentiate the electrochemical activity of the fuel cell electrodes in neutral or alkaline electrolytes.

More particularly this invention concerns fuel cell electrodes containing 1–12% by weight of a noble metal-aluminum alloy incorporated into a diluent metal electrode matrix prior to activation of the electrode. These noble metal-aluminum alloys catalyze the electro-chemical reaction that takes place at the activated hydrogen (fuel) electrode. The electrodes containing small amounts of the noble metal-aluminum alloy are superior electrochemically to comparable electrodes containing the same quantities of unalloyed noble metal.

Throughout this application the following definitions apply.

"Noble metals" refers to those metals of the second and third triads of Group VIII of the Periodic Table also referred to as the palladium and platinum groups respectively. These metals are ruthenium, rhodium, palladium, and osmium, iridium and platinum.

The terms "diluent metals," "diluent base metals," or "base metals" refer to those metals which, unlike the noble metals, are attacked by mineral acids. These metals include among others silver, chromium, titanium, and nickel, but exclude the noble metals defined above.

By "electrochemical performance" is meant the current density developed by an electrode at a given voltage. Optimum electrochemical performance is observed in an electrode when the deviation from the theoretical voltage at a given current density is at a minimum.

"Total surface area" is the area of the electrode matrix that is available as sites for the reaction.

"Total porosity" is the percentage of the electrode matrix volume not made up of solid, represented by the relationship $$\frac{\text{Volume voids (pores)}}{\text{Total volume matrix}} \times 100$$

"Pore size" is the average diameter of the pore opening.

To more clearly illustrate this invention the following drawings are submitted:

FIGURE 1 shows the electrochemical performance of seven different palladium-aluminum alloy electrodes in alkaline electrolyte.

FIGURE 2 indicates the optimum ratio of palladium-aluminum alloy to diluent metal necessary for optimum electrochemical performance.

Figure 1:
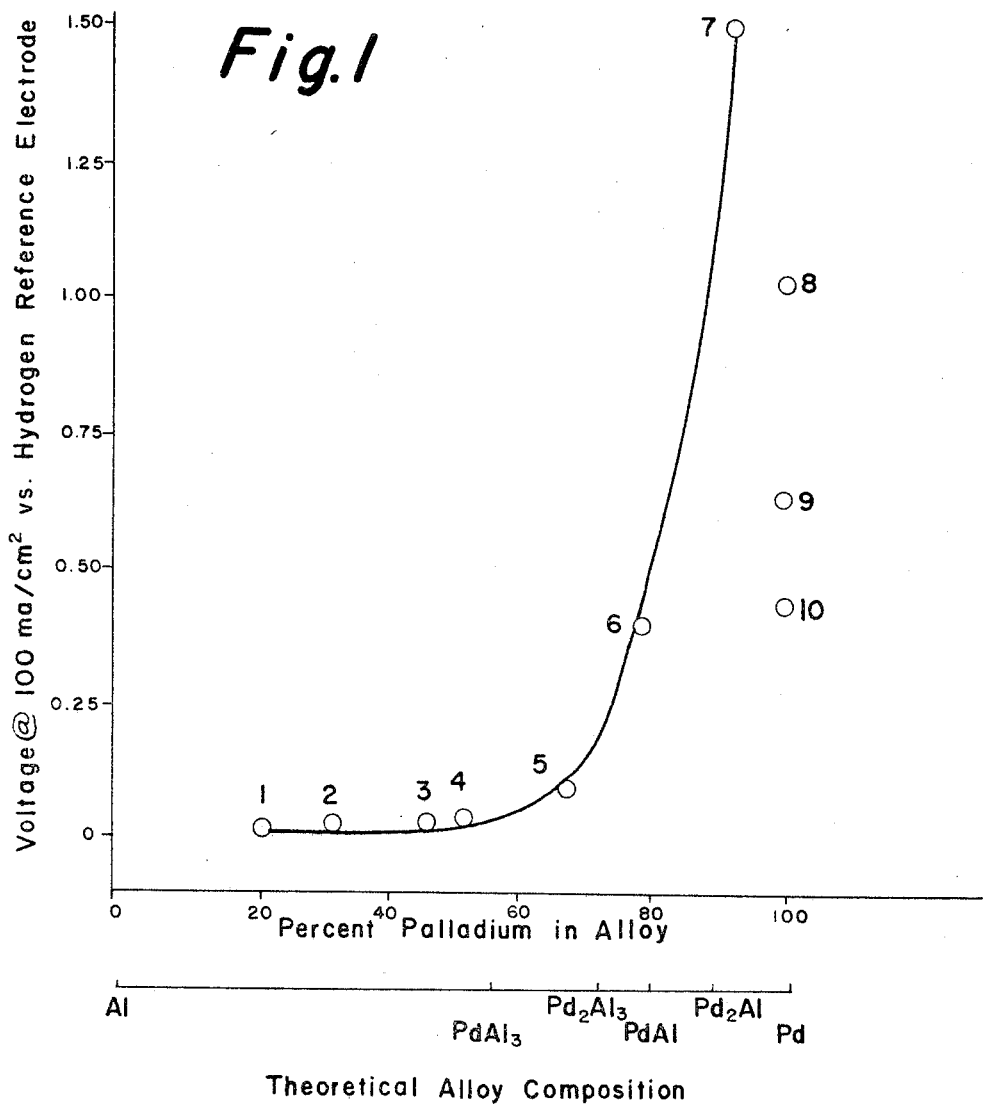

The use of alkaline or neutral electrolytes in fuel cells rather than acid electrolytes is desirable in some respects. For example, since there are many more metals resistant to basic or neutral solutions than to acid solutions, there is greater latitude in the choice of materials from which to fabricate the electrode matrices. Whereas only the extremely costly noble or precious metals and their alloys can be used as electrode matrices in acid electrolytes, the inexpensive base metals or even metallic oxides can be used as electrode matrices in basic or neutral electrolytes.

There is prior art showing the use of certain base metals as electrode matrices. Raney nickel in particular has been extensively used. It offers the advantage of low initial cost, superior electrochemical performance at low temperature, and good structural strength. Unfortunately, Raney nickel has several important physical limitatioins which make its use as a practical electrode undesirable. They are: sensitivity towards oxidation and moderate or high temperatures with the resultant irreversible loss of its electrochemical activity. For example, electrodes fabricated from Raney nickel become deactivated very quickly after any extensive contact with the oxygen in the air. Similarly, when the electrode operates appreciably above 80° C., the surface structure changes and a substantial portion of the electrode's electrochemical activity is irreversibly lost. Once the electrochemical activity of the electrode is exhausted for any reason whatsoever, it cannot be regenerated to any extent. Because of these limitations, a good deal of work has been done to develop an alternative and inexpensive matrix to replace Raney nickel.

Electrode matrices have been fabricated of the noble metals, particularly the metals of the platinum group such as platinum, rhodium, or palladium. These metals are advantageous as electrode matrices because of their resistance to attack by acid or alkali electrolytes and their high level electrochemical performance at high current densities for extended periods of time. In addition, unlike Raney nickel matrices, they are not adversely affected by contact with oxygen. Unfortunately, there are several drawbacks to the unalloyed noble metals which prevent their widespread use as a fuel cell electrode. They are the high cost of the unformed metal, the higher costs of fabrication, and their extreme malleability and ductility.

Not only are these noble metals costly to obtain, but the cost of fabricating noble metals is extremely high compared to the cost of fabricating base metal alloys. The reason for the unusually high cost of fabrication is that the members of the platinum group are the most malleable and ductile of all the metals. These physical characteristics of the noble metals require the use of special and more expensive metallurgical equipment and processes to fabricate them into electrodes. Because of this high malleability and ductility, electrodes fabricated from the noble metals or alloys containing large quantities of them tend to bend or buckle when the electrodes are operated at temperatures above 100° C. for any extended period of time. The cost and structural weakness of the unalloyed noble metals can be overcome to some extent, by combining the noble metals with larger quantities of inexpensive and strengthening diluent metals. Unfortunately, until this time, the performance of the resultant electrodes has been disappointingly poor.

In an attempt to lower the cost of the noble metal electrodes and avoid the detrimental effect on electrochemical performance contributed by the base metals, much work has been done using non-metallic matrices. These matrices are fabricated using porous substances such as carbon and graphite. The finished electrode contains an appreciable amount of the noble metal deposited upon the porous non-metallic matrix. The difficulty has been that these electrodes are too friable and structurally weak to be able to operate for any considerable length of time without breaking. In addition, the electrochemical performance of the non-metallic electrodes has been considerably less than desired, particularly in alkaline electrolytes.

What is needed is a relatively inexpensive electrode with acceptable electrode characteristics requiring only small amounts of a noble metal catalyst; that is, a predominantly base metal matrix having good strength and high electrochemical activity, and which can be fabricated at low cost without special metallurgical techniques. Until this time, the desired balance of cost, strength and performance had not been achieved.

The applicants have unexpectedly found that the incorporation of small quantities of certain noble metal-aluminum alloys, particularly palladium-aluminum, into a predominantly base metal matrix produces an electrode much superior to the unalloyed noble metal and base metal electrodes of the prior art.

The applicants' catalytic alloys range from 20–70% by weight of noble metal and 80–30% of aluminum. These alloys are added to a predominantly base metal or base metal alloy matrix in sufficient quantity, so that prior to activation, the fabricated electrode comprises 88–99% of the base metal or metals and 12–1% of the noble metal-aluminum. The fabricated electrodes are activated by an alkaline leaching process (to be described more fully infra) which removes substantially all the aluminum from the electrodes leaving a highly active porous electrode. The resultant activated electrode is advantageous compared to various electrodes previously described in the prior art for the following reasons.

For example, applicants' activated electrodes are superior to Raney nickel in several respects. They are not as sensitive to oxygen and do not deteriorate electrochemically at high temperatures. Further, when the electrochemical activity diminishes, it can be restored by relatively simple regeneration techniques. The regenerated electrodes are identical in performance with that of the activated electrodes prior to regeneration.

The applicants' noble metal-aluminum alloys incorporated in a diluent metal matrix produce electrodes that are preferable to noble metal, noble metal alloys or non-metallic matrices described in the prior art. For instance, the applicants' activated electrode is structurally strong and does not buckle or bend even during operation at high temperatures and pressures. Because of the large proportion of structurally stong base metal present, the electrodes are easily fabricated using regularly available metal forming equipment. An additional advantage of applicants' activated electrode is that it contains comparatively little of the expensive noble metal catalyst (0.2 to 8.4% by weight). Like unalloyed palladium electrodes, the preferred palladium-aluminum alloys have the ability to store hydrogen in considerable quantities within the electrode for long periods of time. This affinity for hydrogen, so pronounced in palladium itself, is especially valuable in fuel cell installations where current demands are sudden and reach a maximum quickly. These include hospitals, fall-out shelters, and emergency power stations and the like. The availability of the stored hydrogen speeds up starting time for the fuel cell and also minimizes overloading during peak use.

A final considerable advantage that electrodes made from applicants' catalytic noble metal-aluminum alloys enjoy over noble metal or high content noble metal electrodes of the prior art is lower cost. This includes both the much lower cost of the raw materials and the much lower cost of fabricating them.

While all of the above-described catalytic noble metal-aluminum alloys produce electrodes capable of good electrochemical activity, the favored alloys are those where palladium is used as the noble metal. Not only do these electrodes give superior electrochemical performance, but they have a greater ability to store hydrogen than the other noble metal alloys and are less than ⅓ as expensive. Especially good results have been obtained where the palladium content is between 70–20% by weight and the aluminum is correspondingly between 30–80% by weight. The alloys containing 30–55% by weight palladium and 70–45% by weight aluminum are the preferred alloy compositions of this invention because they combine high electrochemical activity with low ductility and malleability. The latter two characteristics allow the electrodes to be fabricated more easily. In this connection it was most surprising to find that the electrochemical activity of the activated fabricated electrode was not proportional to the noble metal content. This was established by the following experiment. A test series of seven electrodes containing different palladium-aluminum alloys ranging in palladium content from 20 to about 90% was fabricated. The electrodes were tested in a half cell in an alkaline electrolyte. Surprisingly, the electrodes found to be most active electrochemically were not those alloys with the highest palladium content but rather those electrodes containing alloys of 20 to about 70% palladium. All of these palladium-aluminum alloys were made up into the same diluent metal matrix and were tested under the same conditions. An additional finding was that the presence of unalloyed palladium is not the major factor; the palladium must be present in the electrode as the palladium-aluminum alloy. This is particularly surprising since substantially all the aluminum present in the electrode is removed by the alkaline leaching process used to produce an activated electrode. That the palladium must be alloyed with the aluminum was shown by an experiment described infra in Example I. In this experiment the electrochemical activity of electrodes containing the palladium alloyed with aluminum was compared to that of electrodes containing the same quantity of an unalloyed palladium. In all instances the electrodes which originally (prior to activation) contained the palladium as the palladium-aluminum alloys were electrochemically superior to the electrodes fabricated from unalloyed palladium.

Table I shows the seven different palladium-aluminum alloys that were tested to determine optimum activity. The last column to the right gives the composition of the phases of these seven palladium-aluminum alloys prior to activation.

TABLE I

| Alloy Number | Composition | | Phase Composition of Alloy |
| --- | --- | --- | --- |
| | Percent Pd | Percent Al | |
| 1 | 20 | 80 | $PdAl_3+Al$ |
| 2 | 30 | 70 | $PdAl_3+Al$ |
| 3 | 45 | 55 | $PdAl_3+Al$ |
| 4 | 54 | 46 | $PdAl_3+Al$ |
| 5 | 67 | 33 | $Pd_2Al_3+PdAl_3$ |
| 6 | 79 | 21 | $PdAl+Pd_2Al_3$ |
| 7 | 88 | 12 | $Pd_2Al+Pd+PdAl$ |

The palladium and aluminum components are not merely mixed but must be combined together as a true alloy. The evaluation of the electrochemical activity of the above seven alloys is described infra in Example I.

The curves of the electrochemical performance of the seven alloys shown in Table I are given in FIGURE 1. As can be seen, the optimum electrochemical performance is obtained in the four alloys lowest in palladium content. These range from 54–20% by weight palladium. This finding is most unusual in view of the prevalent belief in catalysis and electrochemistry that the performance of a catalyst or electrode containing noble metals is directly proportional to the noble metal content available as reaction sites. Ordinarily the factors limiting the proportion of noble metal used are the cost of the electrode and its structural strength requirements. Because the gain in electrochemical activity substantially levels off between 20–30% by weight palladium and these low palladium alloys are extremely difficult to fabricate with existing metallurgical techniques, the alloys containing about 30–55% by weight of palladium and about 70–45% of aluminum represent the preferred alloy compositions of this invention.

Phase diagrams and X-ray diffraction patterns confirmed the phase composition of the seven alloy formulations presented in Table I. While no mechanism is advanced to explain the anomalous behavior of the above alloys, those having an appreciable content of PdAl$_3$ or some multiple of it which upon analysis appears to be PdAl$_3$ are the most active electrodes electrochemically.

The fuel cell electrodes of this invention are fabricated using the procedure given below:

A.—Fabrication of the catalytic noble metal-aluminum alloy electrode

The noble metal-aluminum alloys are prepared according to well known metallurgical techniques using standard commercially available equipment. Since these is little variation from noble metal to noble metal, the fabrication procedure for the palladium-aluminum will be described as being typical for the noble metal-aluminum alloys. The alloy is ground or milled into fine particles using a milling apparatus, a cutting tool, or a grinding device. The resultant particles are screened and separated into two categories according to their mesh size:

(a) Fine particles—<43 microns.
(b) Coarse—45μ–150μ.

The alloy fraction possessing the desired particle size is combined with an appropriate diluent metal or metals having the requisite mechanical strength, resistance to electrolyte corrosion, low cost, and high electrochemical activity. These diluent metals include among many others cobalt, nickel, silver, chromium, titanium, tungsten, niobium, manganese, lead and zinc, and the like as well as alloys of these diluent metals and their oxides. The catalytic alloy-diluent metal mixture is compressed in a standard electrode die, at pressures ranging from 1–50 tons using standard power metallurgical techniques. For the preferred 30–55% palladium, 70–45% aluminum alloys especially good fuel cell electrodes have been obtained using silver, titanium, nickel, or chromium, or combinations of same, as the diluent metals at compressions of 0.5 to 40 tons/sq. inch. All of the disclosed compressed catalyst alloy-diluent metal matrices, upon activation, produce fuel cell electrodes having at least good electrochemical activity. However, the preferred diluent metals for reasons of ease of fabrication, good electrochemical activity, resistance to electrolyte corrosion, low cost, and the like are nickel, silver, and titanium. These preferred diluent metals are combined with the catalytic noble metal-aluminum alloy in the proportion of at least 90–99% by weight of diluent metal to 10–1% by weight of palladium-aluminum alloy. The best results have been obtained where 92–97% by weight of a typical pair of diluent metals (silver and nickel at the ratio of 6:1) is used as matrix with 8–3% of palladium-aluminum during fabrication.

The compressed metal-alloy mixture is heat treated in a standard heat treating furnace in an inert atmosphere such as that provided by hydrogen, argon, nitrogen, neon, helium, and the like. The inert gas prevents unwanted oxidation of the metal surface during the heat treatment. The temperature during heat treatment is closely controlled to keep the heated metals 10–50°C. below the incipient fusion point of the metals. The time required for the heat treatment is a variable, dependent upon such factors as the size of the furnace, the quantity of metal treated, as well as the diluent metals used, among other things. However, for an average batch of metals, a period of between 20 minutes to 24 hours is the extreme time range with 2–12 hours being a more average range. After the heat treatment is complete, the formed electrode is allowed to cool in an inert atmosphere to minimize oxidation. The same insert gases or their equivalents specified in the heat treatment are satisfactory. The formed electrode is allowed to cool to ambient temperature prior to activation.

As indicated earlier, alkaline leaching of the fabricated electrode is essential to the superior electrochemical performance of the finished electrode. By activation is meant the treatment given to the fabricated electrode surface to increase the reaction sites available to the hydrogen fuel at the fuel electrode surface. In addition to the properties imparted by actvitation, certain optimum physical characteristics are essential to the performance of the electrode. These are total surface area, total porosity, and pore size.

The applicants have found that the following ranges of physical characteristics are required for a palladium-aluminum electrode which has superior electrochemical performance.

| Characteristics: | Range |
| --- | --- |
| Total surface area | 1–100 sq. m./g. |
| Total porosity | 30–60%. |
| Pore size | 1–15 microns with >70% 1–5 microns. |

These physical characteristics are imparted to a fabricated palladium-aluminum alloy-base metal mixture by the alkaline leaching process, choice of particle size of the metals used, and by the compacting pressure used.

The activation procedure essentially involves the removal of aluminum from the electrode by leaching with a relatively strong alkali solution. This leaching operation generally removes at least a major part of the aluminum, although some of the aluminum may still be present in the electrode composition after activation. The removal of the aluminum produces a large number of reaction sites or voids in the electrode. These voids increase the surface area of the catalyst many fold with a proportionate gain in activity. A satisfactory leaching solution can be prepared from about 3% by weight or more of an alkali metal oxide, hydroxide or the like in water.

The activation procedure described is identical for electrodes containing any of the noble metal-aluminum alloys. To avoid repetition, the procedure below relates to a typical electrode containing palladium-aluminum.

The formed electrode is immersed in a 1 N aqueous alkali hydroxide solution to moderate the rate of the leaching reaction in a vacuum oven kept at 15–100°C., preferably 24 to 28°C. at a reduced pressure equivalent to 25 inches of mercury. After 8–40 hours, preferably 15 to 24 hours, the electrode is removed from the 1 N alkali solution and placed in a 27% aqueous alkali solution. This solution is placed in a vacuum oven under the same conditions as described above. Depending upon the alloy used, the activation of the electrode in 30% alkali takes from 24–600 hours. The resultant activated electrode operates for extended periods of time at high current densities as a fuel electrode. For example, in life studies on the electrodes in alkaline electrolyte, the electrodes have operated without malfunction for several thousand hours at current densities greater than 100 amps/sq. ft. The electrochemical performance of this type of electrode is superior in either alkaline or neutral electrolyte to that of electrodes containing more unalloyed palladium. Similarly these novel electrodes perform better than electrodes fabricated from Raney nickel or those electrodes formed by depositing noble metals on porous non-metallic matrices. A description of the preparation and activation of the above electrodes is given in detail in the examples which follow.

Example I.—Determining the range of palladium-aluminum alloys with the highest electrochemical activity Ten electrodes are prepared for this experiment. Seven of the electrodes are prepared containing 8% of the seven different palladium-aluminum alloys listed in Table I, diluted with 12% nickel and 80% silver metal. These electrodes (as in Table I) are alloys 1 through 7. Three electrodes designated 8, 9, and 10 are prepared using unalloyed palladium in the same nickel-silver diluent.

The compositions of the ten electrodes before activation are given below in Table II.

TABLE II

| Designation | Composition of Electrodes | | | |
|---|---|---|---|---|
| | Percent, Pd | Percent, Al | Percent, Ni | Percent, Ag |
| Alloy 1 | 1.60 | 6.40 | 12.00 | 80.00 |
| Alloy 2 | 2.40 | 5.60 | 12.00 | 80.00 |
| Alloy 3 | 3.60 | 4.40 | 12.00 | 80.00 |
| Alloy 4 | 4.32 | 3.68 | 12.00 | 80.00 |
| Alloy 5 | 5.36 | 2.64 | 12.00 | 80.00 |
| Alloy 6 | 5.92 | 2.08 | 12.00 | 80.00 |
| Alloy 7 | 7.04 | 0.96 | 12.00 | 80.00 |
| Alloy 8 | 2.00 | 0.00 | 13.00 | 83.00 |
| Alloy 9 | 4.30 | 0.00 | 13.00 | 82.70 |
| Alloy 10 | 5.40 | 0.00 | 13.00 | 81.60 |

Figure 2:
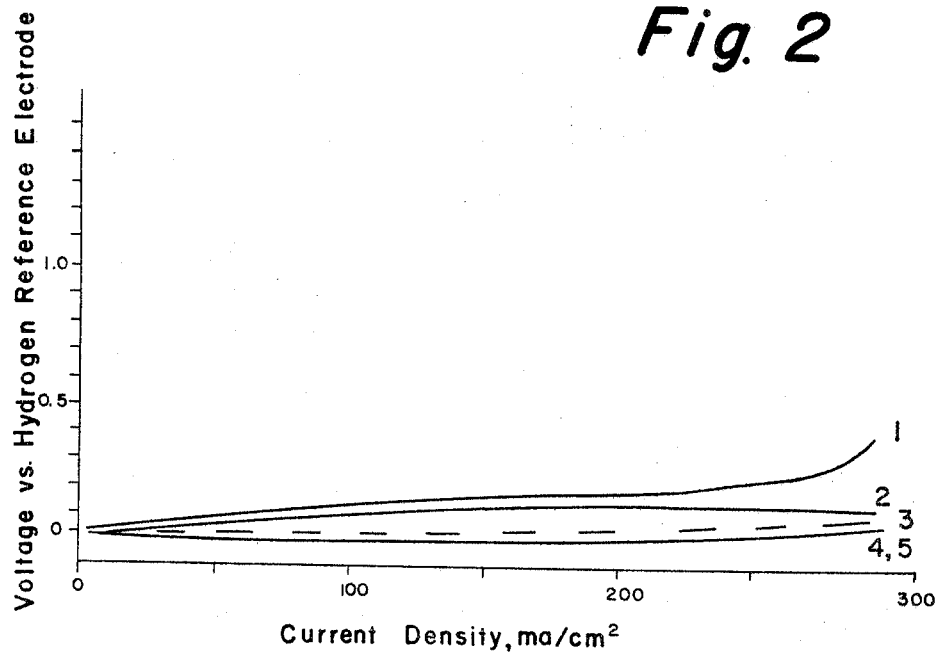

The above electrodes fabricated and activated as described supra are evaluated in a test half cell using the conditions and apparatus described below:

A test half cell is constructed consisting of a ceramic electrode holder, a platinum counter electrode, and a Hg-HgO reference electrode using a 27% KOH electrolyte. A constant current density is applied to the system through a constant direct current supply means and potentials are measured using a high impedance electrometer across the working and reference electrodes. (With respect to FIGURES 1 and 2 referred to hereinafter, the performance data obtained with the Hg-HgO reference electrode for convenience has been transposed to a hydrogen reference electrode.)

The results of the above experiments are given in the performance curves shown in FIGURE 1. The theoretical voltage is indicated by a line parallel to the axis. These data indicate two unexpected findings:

(1) The most active palladium-aluminum alloys are those designated 1-5. These alloys contain less alloyed palladium than 6 and 7, yet give superior performance.

(2) Incorporation of the palladium in the electrode matrix as a palladium-aluminum alloy is the cause of the catalytic activity of the composition after activation rather than the total amount of palladium used. This can be seen by comparing electrodes 2 and 8, 4 and 9, and 5 and 10. The former group (2, 4, and 5) and the latter group (8, 9, and 10) of electrodes contain comparable amounts of palladium in the same metal diluent. Yet the palladium-aluminum alloys 2, 4, and 5 are substantially superior in electrochemical activity to the comparable electrodes 8, 9, and 10 containing almost the same amount of unalloyed palladium.

Example II.—Determining the optimum ratio of palladium-aluminum alloy to metal diluent Five electrodes are fabricated using the palladium-aluminum alloy designated No. 3 in Example I, combined with different quantities of a silver-nickel diluent matrix. The electrodes tested are as follows:

| | Percent Alloy #3 | Matrix Diluent | |
|---|---|---|---|
| | | Percent, Ag | Percent, Ni |
| Electrode: | | | |
| 1 | 1 | 85.5 | 13.5 |
| 2 | 3 | 83.5 | 13.5 |
| 3 | 5 | 81.5 | 13.5 |
| 4 | 8 | 79.0 | 13.0 |
| 5 | 10 | 78.0 | 12.0 |

These electrodes are tested using the half cell and procedure described in Example I. The performance curves are given in FIGURE 2. The curves establish that the optimum amount of palladium-aluminum alloy in a typical metal diluent is in the range of 2 to 10 parts of alloy to 98 to 90 parts of diluent. Essentially equivalent performance is obtained in electrodes 2, 3, 4, and 5 with a break in the activity as well as the poorest activity being observed in electrode 1 where the ratio is 1 part of alloy to 99 parts of diluent.

Example III.—A comparison of an electrode containing a preferred palladium-aluminum alloy with a Raney nickel electrode of the prior art Two electrodes are fabricated for testing. One electrode is fabricated from 3% of the alloy designated alloy No. 3 in Example I. This alloy is combined with 13% Ag and 84% nickel and then leached to make the finished electrode. The second electrode is a Raney nickel electrode prepared as described by Justi et al. in the book "High Drain Hydrogen Diffusion Electrodes," Franz Steiner, Weisbaden (1960).

Figure 3:
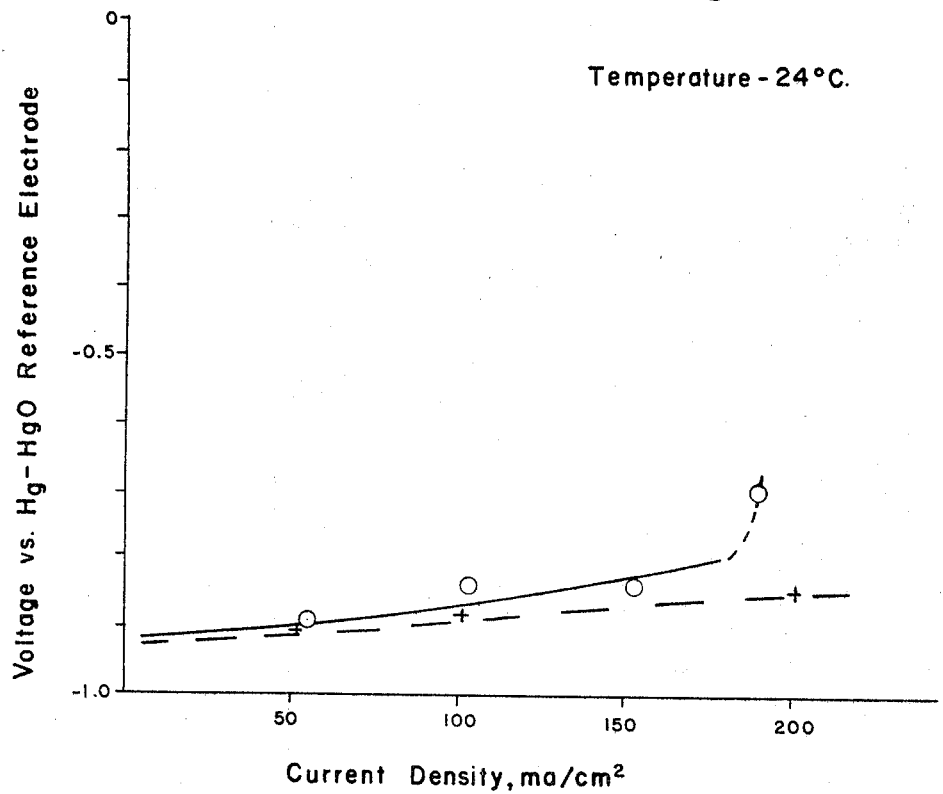
FIGURE 3 shows a comparison of the performance of a hydrogen electrode containing the preferred catalytic alloy with that of a Raney nickel hydrogen electrode of the prior art.

Both electrodes are compared in a 27% KOH electrolyte using the test half cell and procedures described in Example I. The performance curves of the electrode containing palladium-aluminum alloy is shown by the crossed symbols in FIGURE 3. The performance curves of the prior art Ranel nickel electrode are indicated by the circular symbols in FIGURE 3. The curves establish that applicants' palladium-aluminum alloy is electrochemically superior to the Raney nickel of the prior art, particularly at higher current densities.

Example IV.—Electrochemical performance of the same palladium-aluminum alloy in various diluent metallic matrices Five compositions are prepared, each containing 5% by weight of alloy No. 3 (45% Pd, 55% Al) in five different diluent matrices. The compositions were leached with alkali to prepare the activated electrodes.

The electrodes are tested using the half cell and procedures described in Example I. For convenience the potential observed at a current density of 100 ma./cm.$^2$ is used for comparing the activities of the five electrodes. The performance data and the composition of the electrodes appear in Table III.

TABLE III

| Electrode Number | Composition Prior to Activation, percent | | | | | | Voltage vs. Hydrogen at 100 ma./cm.$^2$ |
|---|---|---|---|---|---|---|---|
| | Pd | Al | Ti | Ni | Cr | Ag | |
| 1 | 2.25 | 2.75 | | 13 | | 82 | +0.150 |
| 2 | 2.25 | 2.75 | 13 | | | 82 | +0.135 |
| 3 | 2.25 | 2.75 | | | 13 | 82 | +0.140 |
| 4 | 2.25 | 2.75 | | 95 | | | +0.155 |
| 5 | 2.25 | 2.75 | | 65 | | 30 | +0.162 |

As can be seen, essentially equivalent electro-chemical performance is observed, with five diffferent diluent systems. This appears to indicate that the choice of diluent is not critical for superior activity whereas the nature of the palladium-aluminum alloy is important.

Example V.—Electrochemical performance of a platinum-aluminum and rhodium-aluminum alloy in various diluent metallic matrices In an analogous experiment to that of Example IV, electrodes are prepared using platinum-aluminum and rhodium-aluminum alloys. These alloys are identical to alloy 3 except that the 3.60% palladium content is replaced with 3.60% platinum and 3.60% rhodium respectively. The diluent matrices are the same metals in the same proportions as given in Table III.

The activated electrodes are tested using the half cell and procedures in Example I. A current density of 100 ma./cm.$^2$ is used to compare the activity of the ten electrodes. The performance data and composition of the electrodes appears in Table IV.

TABLE IV

| Electrode number | Composition prior to activation, percent | | | | | | | Voltage vs. hydrogen at 100 ma./cm.² |
|---|---|---|---|---|---|---|---|---|
| | Rh | Pt | Al | Ti | Ni | Cr | Ag | |
| 1 | 2.25 | | 2.75 | | 13 | | 82 | +0.172 |
| 2 | 2.25 | | 2.75 | 13 | | | 82 | +0.178 |
| 3 | 2.25 | | 2.75 | | | 13 | 82 | +0.174 |
| 4 | 2.25 | | 2.75 | | 95 | | | +0.168 |
| 5 | 2.25 | | 2.75 | | 65 | | 30 | +0.183 |
| 6 | | 2.25 | 2.75 | | 13 | | 82 | +0.181 |
| 7 | | 2.25 | 2.75 | 13 | | | 82 | +0.172 |
| 8 | | 2.25 | 2.75 | | | | 82 | +0.182 |
| 9 | | 2.25 | 2.75 | | 95 | | | +0.188 |
| 10 | | 2.25 | 2.75 | | 65 | | 30 | +0.161 |

As indicated by Table IV, electrodes containing platinum-aluminum and rhodium-aluminum alloys combined with the specified diluent matrix give good electrochemical performance. However, the much higher cost of these other noble metal electrodes and their inferior electrochemical performance compared to palladium-aluminum alloy (No. 3) evaluated in Example I, Table II makes them less attractive. Again the activity of the fabricated electrode appears to depend upon the use of the noble metal-aluminum alloy, rather than the choice of diluent.

Example VI.—Comparison of extent of regeneration of a palladium-aluminum alloy and a Raney nickel electrode Two test electrodes are prepared. One electrode is fabricated from 8% of alloy No. 3 (45% Pd and 55% Al) with 79% silver and 13% nickel diluent matrix. The second test electrode is the Raney nickel electrode described in Example III. The electrochemical activity of each electrode is determined in 27% KOH using the test half cell and procedure described in Example I.

Figure 4A:
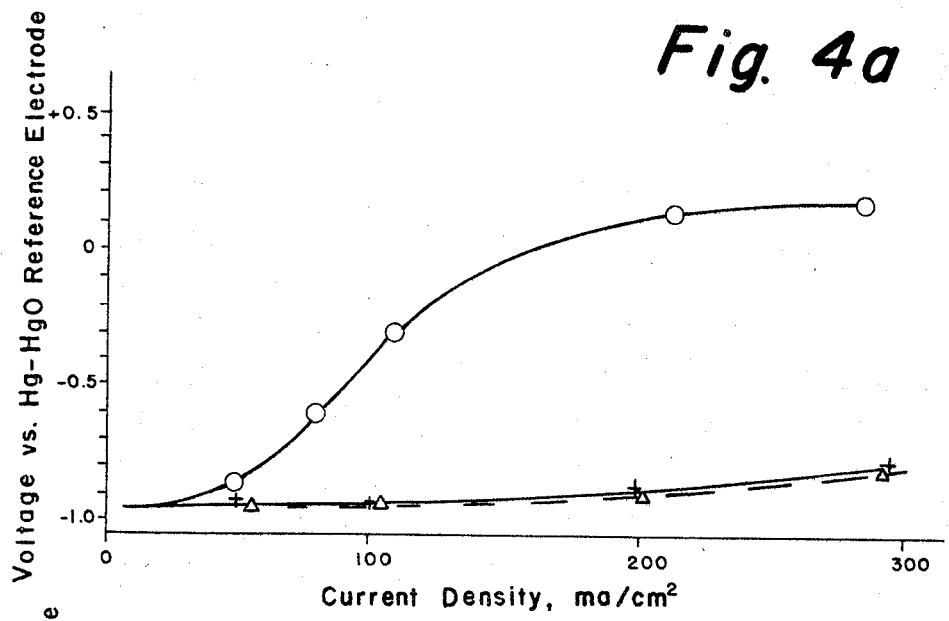
FIGURES 4a and 4b show the extent to which comparable Raney nickel and palladium-aluminum alloy electrodes are affected by extensive contact with air and the degree of recovery that can be effected by purging with hydrogen.

The palladium-aluminum alloy electrode is washed with distilled water and stored for 5 months in open air. After storage the electrode is tested as above. After testing the electrode is purged by passing hydrogen through it for 10 hours. After the purging procedure is completed the electrode is retested in the test half cell system described above. The results of the three tests appear in FIGURE 4a. The performance of the original palladium-aluminum alloy is shown in the curve using triangular symbols. The performance of the palladium-aluminum alloy after 5 months' storage is shown by the curve using circular symbols. The performance of the electrode after purging is shown by the curve designated by cross symbols.

Figure 4B:
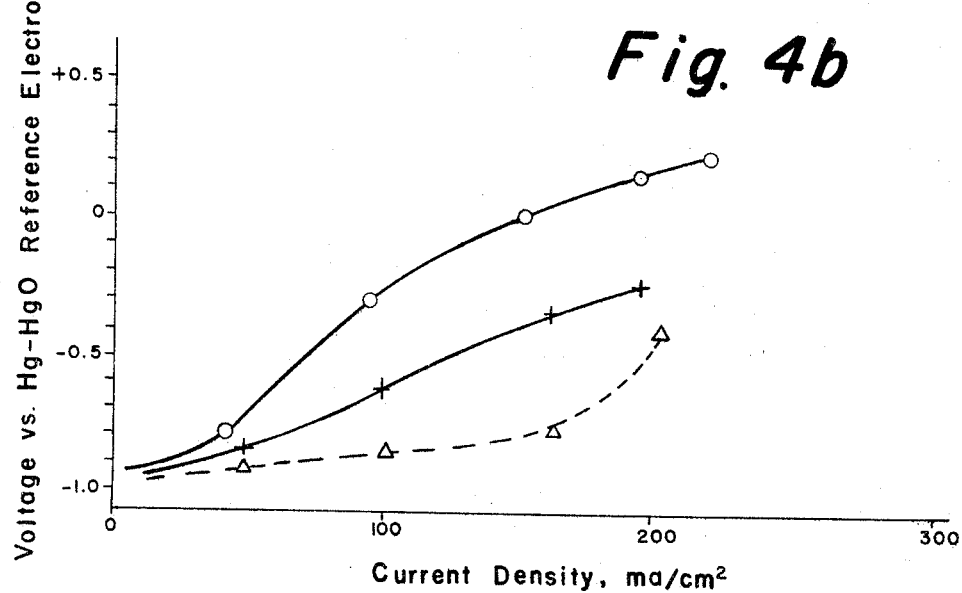

Following the same procedure described in (a) above, the electrochemical activity of a Raney nickel electrode described in Example III is determined prior to 5 months' storage, after 5 months' storage, and after purging with hydrogen for 10 hours, as described above. The performance curves of the Raney nickel electrode are shown in FIGURE 4b. Again the triangular symbol represents activity prior to 5 months' storage in air, and the crossed symbols the activity of the electrode after purging for 10 hours with hydrogen.

As can be seen by the two figures, the initial activity of both the palladium-aluminum alloy and the Raney nickel alloy is substantially reduced after storage in air. However, whereas substantially all of the electrochemical activity of the palladium-aluminum alloy is restored almost immediately by purging with hydrogen, only a small fraction of the electrochemical activity of the Raney nickel is recovered using the same regeneration procedure.

We claim:

1. An electric-current generating fuel cell comprising an oxygen-gas electrode, a hydrogen electrode and an alkaline electrolyte and an electrolyte in contact with both said electrodes, said hydrogen electrode having been prepared by compounding 88–99% by weight of a diluent metal matrix selected from the group consisting of silver, chromium, titanium, nickel and mixtures thereof and 1–12% by weight of a catalytic noble metal-aluminum alloy ranging in content from 20–70% by weight of noble metal and 80–30% by weight of aluminum, and treating said composition with an alkali leaching solution until at least a major portion of the aluminum is removed.

2. A fuel cell in accordance with claim 1 wherein the hydrogen electrode is prepared from palladium as the noble metal and nickel and silver as the diluent metal matrix.

3. A fuel cell in accordance with claim 1 wherein the hydrogen electrode is prepared using nickel and silver as the diluent metal matrix.

4. A fuel cell in accordance with claim 1 wherein the hydrogen electrode is prepared using silver as the diluent metal matrix.

5. A fuel cell in accordance with claim 1 wherein the hydrogen electrode is prepared using nickel as the diluent metal matrix.

6. A fuel cell in accordance with claim 1 wherein the hydrogen electrode is prepared using titanium and silver as the diluent metal matrix.

7. A fuel cell in accordance with claim 1 wherein the hydrogen electrode is prepared using chromium and silver as the diluent metal matrix.

References Cited

UNITED STATES PATENTS

| 1,213,191 | 10/1959 | Friese et al. | 204—143 |
| 3,068,157 | 12/1962 | Vielstich et al. | 136—86 |
| 3,147,203 | 9/1964 | Klass | 136—86 |
| 3,150,011 | 9/1964 | Winsel et al. | 136—120 |
| 1,988,059 | 1/1935 | Van Loon | 204—293 |
| 2,384,501 | 9/1945 | Streicher | 252—477 |
| 3,035,998 | 5/1962 | Sommer et al. | 136—86 |
| 3,062,909 | 11/1962 | Rentschi | 136—86 |

OTHER REFERENCES

Justi and Winsel: Journal of the Electrochemical Society, vol. 108, No. 11, November 1961, pp. 1073 to 1079, 204/284.

Krupp et al.: Journal of Electro-Chemical Society, vol. 109, July 1962, pp. 553–557.

JOHN H. MACK, Primary Examiner.

W. Van SISE, Assistant Examiner.

U.S. Cl. X.R.

136—120; 29—182; 75—172